US011146490B2

(12) United States Patent
Agrawal et al.

(10) Patent No.: US 11,146,490 B2
(45) Date of Patent: Oct. 12, 2021

(54) DISTRIBUTED LOAD BALANCER HEALTH MANAGEMENT USING DATA CENTER NETWORK MANAGER

(71) Applicant: Cisco Technology, Inc., San Jose, CA (US)

(72) Inventors: Manish Chandra Agrawal, San Jose, CA (US); Samar Sharma, San Jose, CA (US); Shyam Kapadia, San Jose, CA (US); Lukas Krattiger, Pleasanton, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 14 days.

(21) Appl. No.: 16/405,561

(22) Filed: May 7, 2019

(65) Prior Publication Data

US 2020/0358702 A1 Nov. 12, 2020

(51) Int. Cl.
*H04L 12/803* (2013.01)
*G06F 9/50* (2006.01)
*H04L 12/835* (2013.01)

(52) U.S. Cl.
CPC ............ *H04L 47/125* (2013.01); *G06F 9/505* (2013.01); *H04L 47/30* (2013.01)

(58) Field of Classification Search
None
See application file for complete search history.

(56) References Cited

U.S. PATENT DOCUMENTS

| 9,253,076 | B2 | 2/2016 | Gabriel et al. |
| 9,325,636 | B2* | 4/2016 | Yang ........................ H04L 12/18 |
| 9,432,294 | B1* | 8/2016 | Sharma ............... H04L 45/7457 |
| 9,559,961 | B1 | 1/2017 | Sorenson, III et al. |
| 9,787,764 | B2* | 10/2017 | Anand ................ H04L 41/0695 |
| 9,853,903 | B1* | 12/2017 | Sharma .................... H04L 45/38 |
| 9,871,712 | B1 | 1/2018 | Sorenson et al. |
| 9,954,783 | B1* | 4/2018 | Thirumurthi ......... H04L 47/125 |
| 10,171,362 | B1 | 1/2019 | Thirumurthi et al. |
| 2009/0193105 | A1* | 7/2009 | Charny .................... H04L 47/10 709/223 |
| 2013/0121137 | A1* | 5/2013 | Feng ..................... H04L 45/586 370/221 |
| 2014/0258485 | A1* | 9/2014 | Yang ........................ H04L 45/02 709/223 |

(Continued)

OTHER PUBLICATIONS

International Search Report and Written Opinion from the International Searching Authority, dated Jul. 6, 2020, 14 pages, for corresponding International Patent Application No. PCT/US2020/029943.

*Primary Examiner* — Nicholas Sloms
(74) *Attorney, Agent, or Firm* — Polsinelli

(57) ABSTRACT

The disclosed technology relates to a load balancing system. A load balancing system is configured to receive health monitoring metrics, at a controller, from a plurality of leaf switches. The load balancing system is further configured to determine, based on the health monitoring metrics, that a server has failed and modify a load balancing configuration for the network fabric. The load balancing system is further configured to transmit the load balancing configuration to each leaf switch in the network fabric and update the tables in each leaf switch to reflect an available server.

20 Claims, 7 Drawing Sheets

(56) References Cited

U.S. PATENT DOCUMENTS

| | | | |
|---|---|---|---|
| 2014/0321462 A1* | 10/2014 | Kancherla | H04L 45/72 370/389 |
| 2015/0019746 A1* | 1/2015 | Shatzkamer | H04L 67/322 709/228 |
| 2015/0312134 A1* | 10/2015 | Kapadia | H04L 45/02 370/256 |
| 2016/0234071 A1* | 8/2016 | Nambiar | H04L 45/00 |
| 2016/0283544 A1* | 9/2016 | Prieto | H04L 43/065 |
| 2016/0315814 A1 | 10/2016 | Thirumurthi et al. | |
| 2016/0316005 A1* | 10/2016 | Thirumurthi | H04L 67/1023 |
| 2017/0324664 A1* | 11/2017 | Xu | H04L 12/4633 |
| 2018/0109454 A1* | 4/2018 | Holmberg | H04L 45/7453 |
| 2018/0288135 A1* | 10/2018 | Narayan | G06F 11/3466 |
| 2019/0052567 A1* | 2/2019 | Muntz | H04L 47/122 |
| 2019/0104069 A1* | 4/2019 | Kommula | H04L 41/0893 |

* cited by examiner

DISTRIBUTED LOAD BALANCER HEALTH MANAGEMENT USING DATA CENTER NETWORK MANAGER

TECHNICAL FIELD

The subject matter of this disclosure relates in general to the field of data center networks, and more specifically load balancing for within a distributed data center network.

BACKGROUND

A typical data center network contains a myriad of network elements including servers, load balancers, routers, switches, etc. A load balancing device may be used to distribute workloads between multiple nodes. The load balancing device may include a health monitoring application to determine a status associated with a node, such as the availability of the node for receiving workload. The load balancing device may determine the status by periodically probing the node.

In a distributed data center, the servers and the virtual machines (VMs) can be distributed across the fabric and attached to different leaf switches. The distributed load balancing enables loading balancing to the servers that are distributed across the fabric. Each leaf switch has to probe the servers to know about the status of each of the servers connected to all the other leaf switches, which leads to a heavy amount of control traffic injected in the fabric.

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
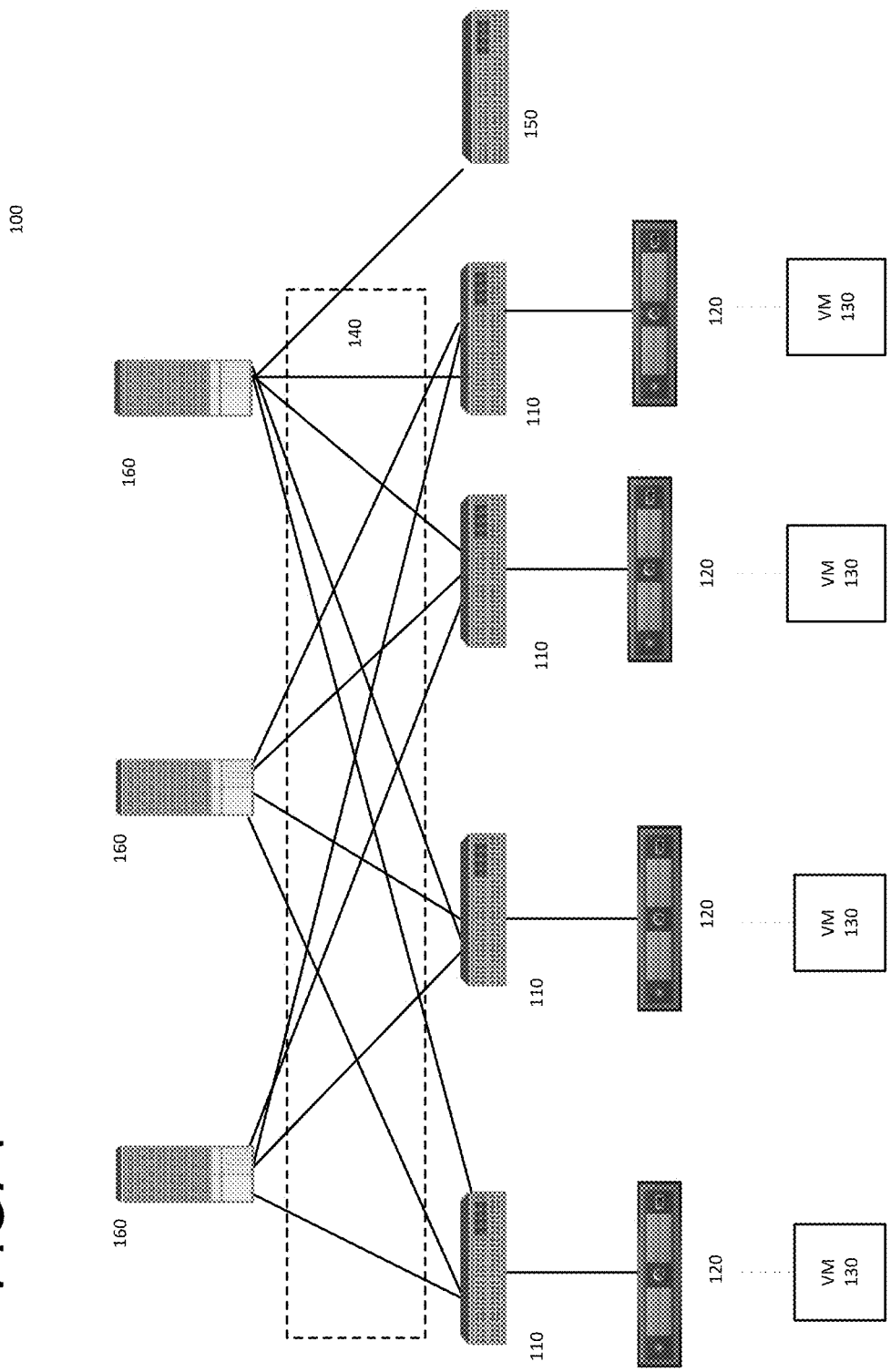
FIG. 1 is a simplified schematic diagram illustrating an example data center network in which systems and/or methods described herein can be implemented.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

A cluster of workload servers may be provisioned, either as physical servers or as virtual machines, in an example of a known computing system to provide a desired feature to end-users or clients. There is a need for load balancing to achieve the above functionalities in standalone switch fabric. The disclosed technology addresses the need in the art for a more efficient way to manage a distributed load balancer, where client requests are distributed across multiple application servers. The disclosed technology allows for the controller to probe each leaf, while each leaf probes only its local server or servers. The controller monitors the health of a server, tracks it, and reports it.

Various embodiments of the subject technology address these and other technical problems by providing a controller that performs load balancing by subscribing to health monitoring metrics provided by the leaf switches. The controller operates by way of an application that is running on a server. The controller can communicate with the switch fabric through a management network within a larger network framework.

DETAILED DESCRIPTION

Various embodiments of the disclosure are discussed in detail below. While specific implementations are discussed, it should be understood that this is done for illustrative purposes only. A person skilled in the relevant art will recognize that other components and configurations may be used without departing from the spirit and scope of the disclosure.

There is a need to be able monitor the health of a server or application that is connected to another leaf in the fabric without probing each server. When each leaf in a fabric probes all of the servers in a fabric, whether they are connected to it or not, this injects a heavy amount of control traffic into the fabric leading to the utilization of large amounts of bandwidth.

Various embodiments relate to a load balancing device configured to probe, monitor, track, and report the health of servers or applications running on the servers. The load balancing device receives health monitoring metrics, determines that a server has failed, and modifies the load balancing configuration on a network fabric. Health monitoring metrics are obtained by a controller probing each leaf in a fabric. Each leaf in the fabric probes only the servers they are connected to.

By having the load balancing functionality in a controller, this decreases the traffic in the access layer of the fabric, which can improve available capacity and reduce packet loss rates within data centers.

FIG. 1 is a simplified schematic diagram illustrating an example data center network 100 in which systems and/or methods described herein can be implemented. As shown in FIG. 1, example data center network 100 may include leaf switches 110 that are connected to one or more host servers 120, each of which can run a collection of virtual machines 130. Host servers 120 communicate over a particular subnet, which leads to the subnet being installed in the attached leaf switches 110.

Virtual Extensible LAN (VXLAN) or other encapsulation may be used to implement an overlay 140. In some embodiments, a packet is delivered from one end device to another on the data center network 100. The network in FIG. 1 has leaf switches 110 and spine switches 140 as well as service nodes (e.g., host server 120, VM, container, micro-service, application unit, etc.). Each of spine switches 160 connects to all the leaf switches 110. Host servers 120 are connected to a leaf switch 110.

The data center network 100 shown in FIG. 1 may contain a mapping so that the spine switch 160 knows which leaf switch 110 a host server 120 is attached to. It is understood that leaf switches 110 and spine switches 160 may have switching or routing capabilities. In one example, the spine switches 160 are made Route Reflectors in the network fabric for the data center network 100.

A distributed Internet Protocol (IP) anycast gateway may be at the leaf or access layer. The fabric architecture is based on a leaf-spine topology. There are border leaf switches 150 that connect the fabric to external networks. Spine switches 160 with border functionality may also be employed.

Tables are maintained in the leaf switches 110 in forwarding logic. In some embodiments, these are similar to the forwarding tables maintained in conventional networks. Encapsulation allows a network administrator to move a host server 120 around, from one leaf switch 110 to another leaf switch 110. In various embodiments, only the leaf switch 110 tables are made aware of the details of the host server 120 identity.

Border leaf switches 150 can connect different data centers to an IP backbone, allowing one data center to send and receive layer-2 traffic between another data center. To do so, within data centers, leaf routers each function as a VxLAN tunnel end point (VTEP). VTEPs originate and terminate the VXLAN segments, where each VTEP maps host servers 120 to VXLAN segments and performs VXLAN encapsulation and de-encapsulation.

In FIG. 1, to support overlay network 140, leaf switches 110 are configured as VTEPs that originate and terminate the VXLAN segments defining overlay network 140. For example, leaf switches 110 perform VXLAN encapsulation and de-encapsulation, and map host servers 120 to the VXLAN segments. In general, a subnet is a Layer 3 construct, while a VXLAN segment is a Layer 2 construct.

Host servers 120 may communicate on a different subnet, and can be assigned a network address on the different subnet. The larger network may be any type of fabric that uses Border Gateway Protocol (BGP) as a control plane, such as a switch fabric, to advertise IP reachability within a larger network. The fabric may achieve optimal Layer 2 and Layer 3 forwarding via distribution of IP reachability information over the control plane, which enables a distributed IP anycast gateway at the leaf or access layer.

As used herein, the term "subnet" is a logical grouping of connected network elements that share a contiguous range of IP addresses. A "host server" 120 is any end device in a data center network. In that data center network, the host can either be a server, a client or both. A client on the other hand is a computer that has software that enables it to send requests to the server 120 for a particular service.

Figure 2:
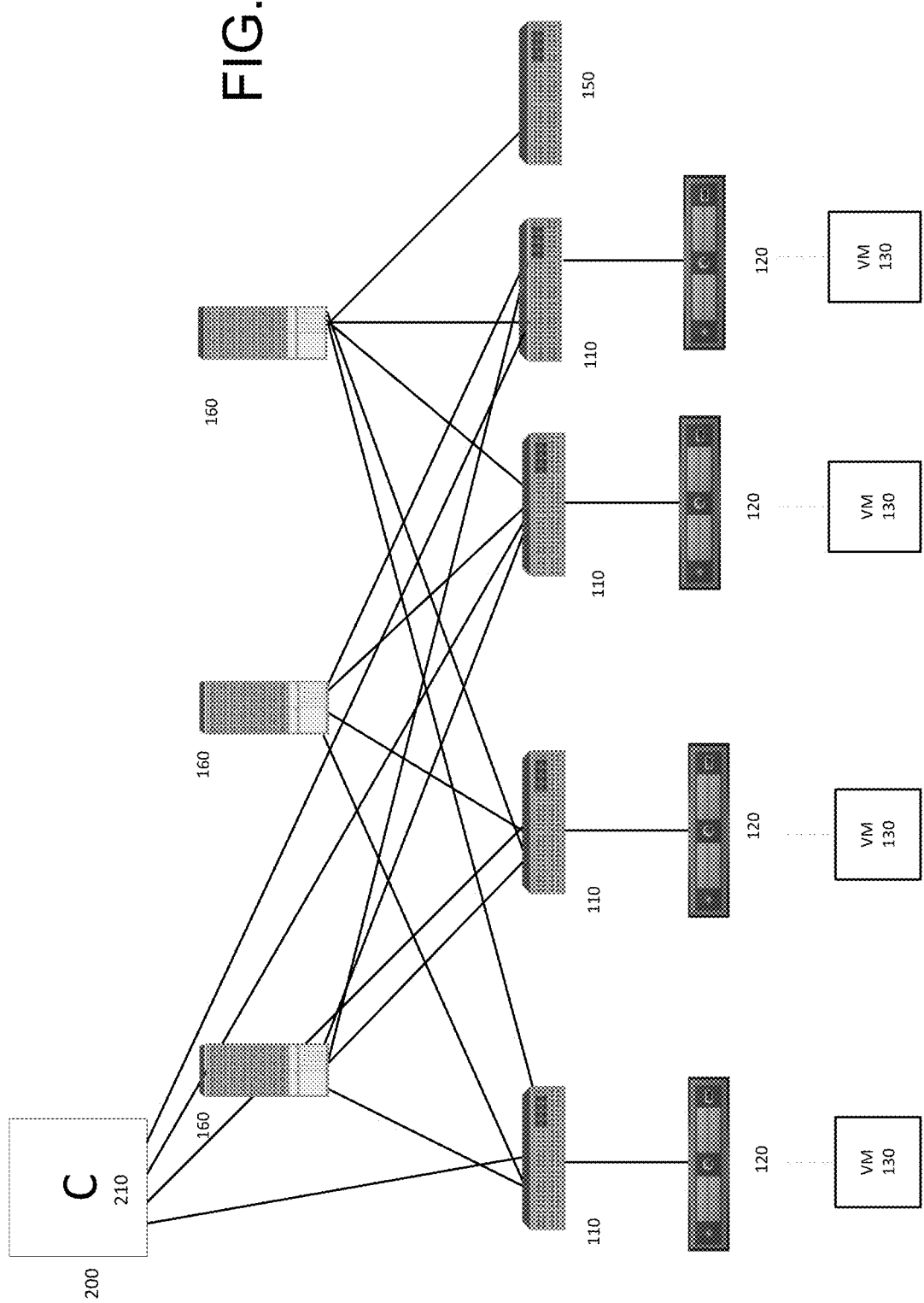
FIG. 2 is a simplified schematic diagram illustrating a controller in a data center network, according to various aspects of the subject technology.

FIG. 2 is a simplified schematic diagram illustrating a controller 200 in a data center network, according to various aspects of the subject technology. The controller 200 can have an application 210 on a server, a separate machine, a service hosted outside the data center network, or implemented using some other configuration. The application 210 manages a network's independent components inside a bigger network management framework and performs several key functions. The application 210 on controller 200 identifies, configures, monitors, updates and troubleshoots routers, switches, and other network components by collecting health metrics. Health metrics may include a number of connections to a service, a number of packets sent to or transmitted by the service, a response time of the service to respond to a request, and use of network bandwidth by the service.

In some embodiments, health metrics may be indications of whether a service node as failed. The controller 200 may obtain the health metrics for the service nodes in the fabric by probing each leaf switch in a data center using a service. In the service, a publisher application creates and sends messages to a topic. The publisher application is each leaf switch 110 in the plurality of leaf switches and the subscriber is the controller 200 with application 210 running on it. Subscriber applications create a subscription to a topic to receive messages from it. Communication can be from one controller to many leaf switches. A publisher application creates a topic in the service and sends messages to the topic. A message contains a payload and optional attributes that describe the payload content. The service forwards messages from a topic the controller which, subscribes to the messages. The messages are received by the service either pushing them to the subscriber's chosen endpoint, or by the subscriber pulling them from the service. In some embodiments, the controller 200 may transmit requests to the leaf switches 110 and receive the requested data without subscribing to the metrics published by the leaf switches 110.

The mapping of buckets to service nodes can be maintained by one or more switches in the fabric. For example, spine switches 160 and leaf switches 110 in the fabric can include software defining the mapping of service or hash buckets to service nodes. When a service node for a flow fails, the software on the switch can steer the flow to an available and active node. The mapping of buckets to service nodes can also be coordinated between the service nodes and the fabric, including one or more switches in the fabric. In some embodiments, the leaf switches 110 can be configured to direct or redirect traffic based on the mapping of buckets to service nodes, which creates a packet path for forwarding of traffic for each bucket. This can include one-to-one mapping of a traffic bucket to a service node, or many-to-one mapping of traffic buckets to a service node. The mappings can be contained in a Ternary Content Addressable Memory (TCAM) table 500 associated with a Static Random Access Memory (SRAM) table 510, further discussed in FIG. 5.

When a leaf switch 110 receives incoming requests, the controller 200 operates to execute an appropriate algorithm (e.g., Round Robin, least connections, least traffic, Source IP, etc.) for assigning the incoming request to a server 120. The controller 200 communicates the assignments by propagating the information the plurality of leaf switches 110. After assigning the server 120, the controller 200 modifies the load balancing configuration by modifying the hardware programming on all of the leaf switches 110 to reflect an available and active server to replace the failed server.

The controller 200 can modify the load balancing configuration in the network architecture using different load balancing algorithms, when the user has not already configured a server 120. One algorithm will assign the service requests to the next server in the sequence. Alternatively, one algorithm will measure the load on each server to determine which server has the most available resources to service a request and will send a new request to the server with the fewest current connections to clients. In another algorithm, the IP address of the client is used to determine which server receives the request.

Figure 3:
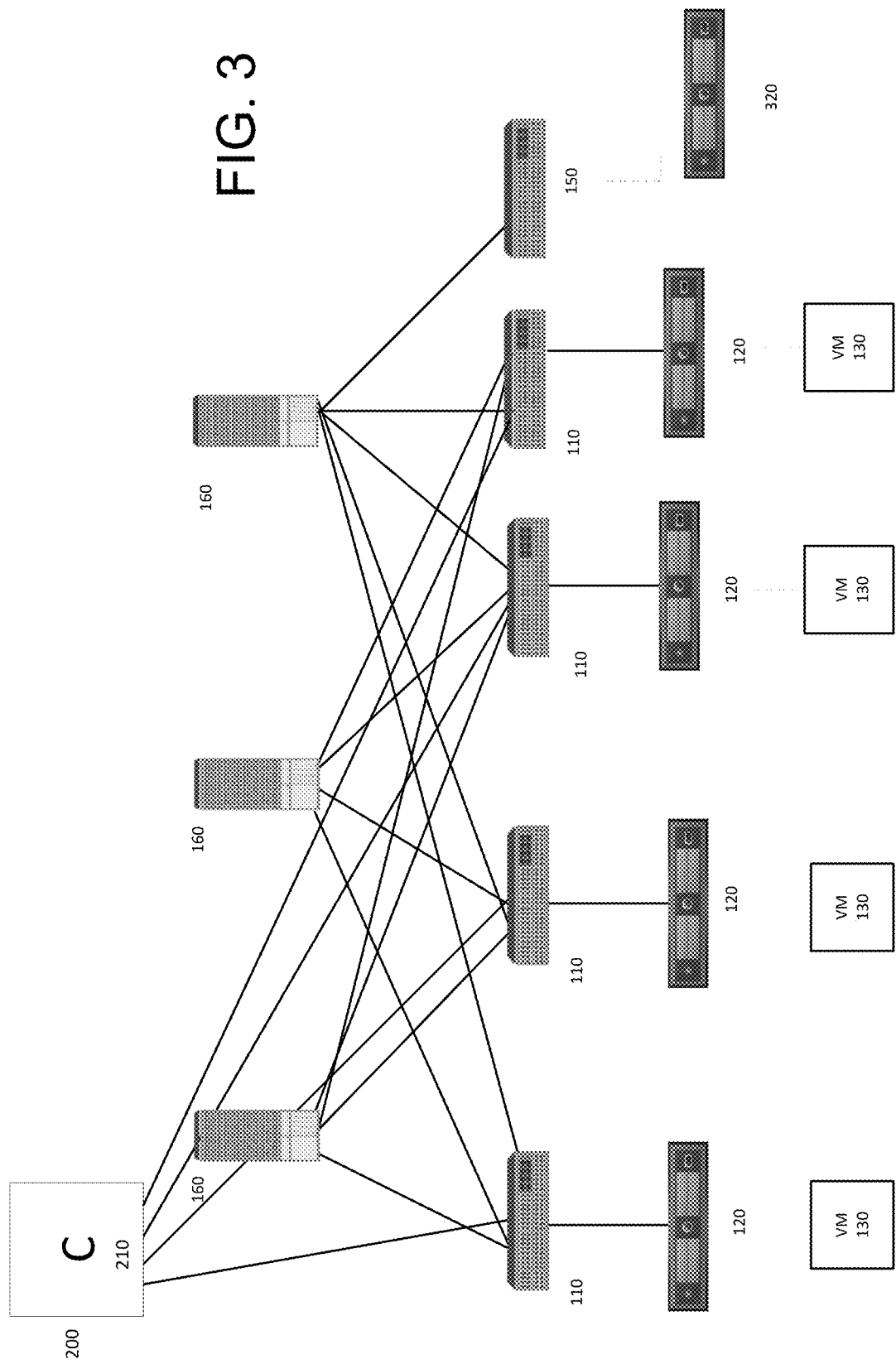
FIG. 3 is a simplified schematic diagram illustrating a controller in a data center network with a standby node configured, according to various aspects of the subject technology.

FIG. 3 is a simplified schematic diagram illustrating a controller 200 in a data center network 100 with a standby node configured, according to various aspects of the subject technology. In this example, border leaf switch 150 L4 is configured to host server 120 S5. Upon failure of any other host server 120 connected to any other leaf switch 110, the controller 200 will configure host server 120 S5 to receive the incoming traffic. The controller 200 will send a message to all of the leaf switches 110 in the fabric with the address of the failed server and indicate the active and available server previously configured.

Figure 4:
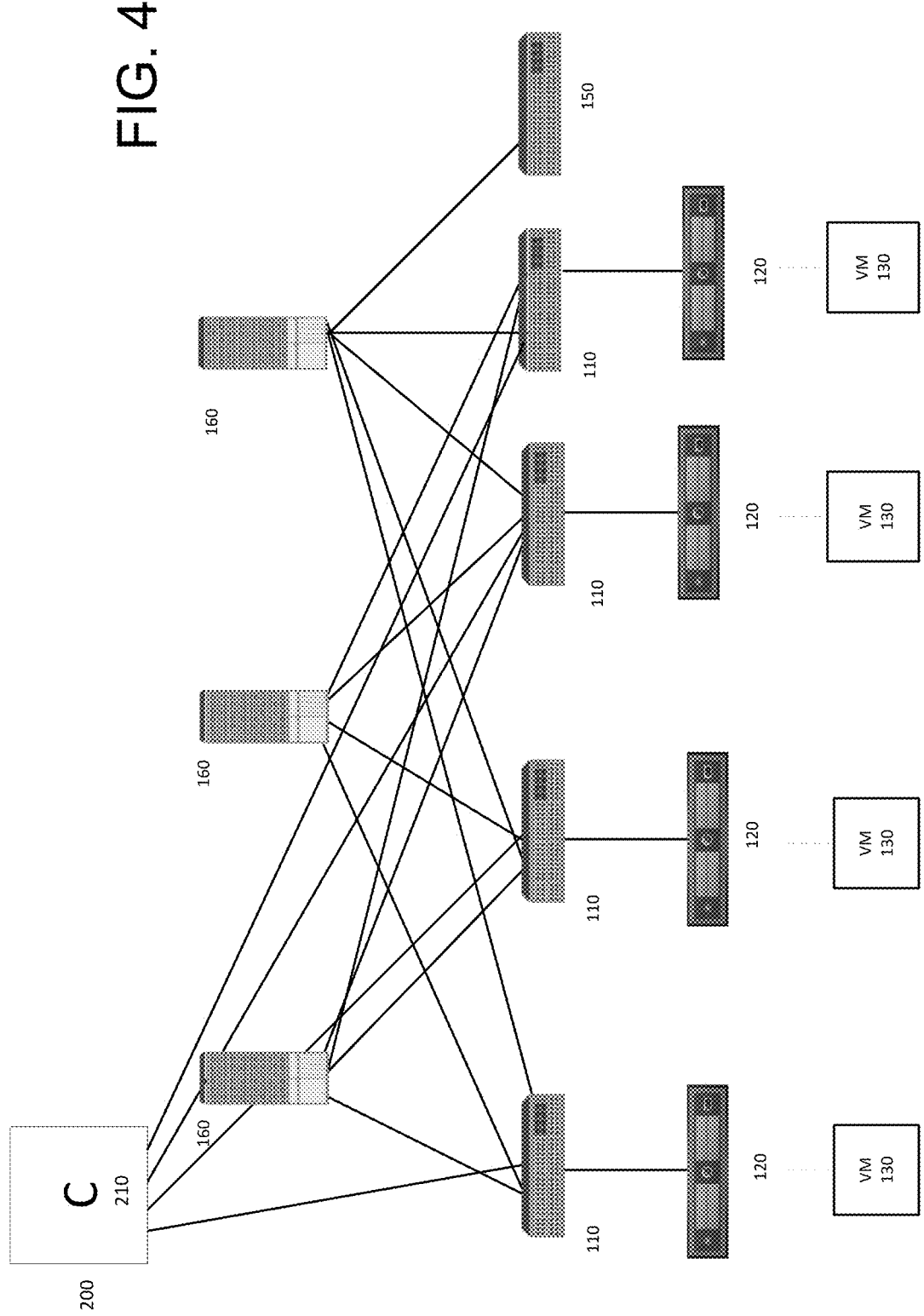
FIG. 4 is a simplified schematic diagram illustrating a controller in a data center network without a standby node configured, according to various aspects of the subject technology.

FIG. 4 is a simplified schematic diagram illustrating a controller 200 in a data center network 100 without a standby node configured, according to various aspects of the subject technology. In this example, border leaf switch 150 L4 is not configured to any host server 120. Upon failure of any other host server 120 connected to any other leaf switch 110, the controller 2000 will configure host server 120 S0 to receive the incoming traffic. The host server can be chosen by various load balancing algorithms described above.

Figure 5:
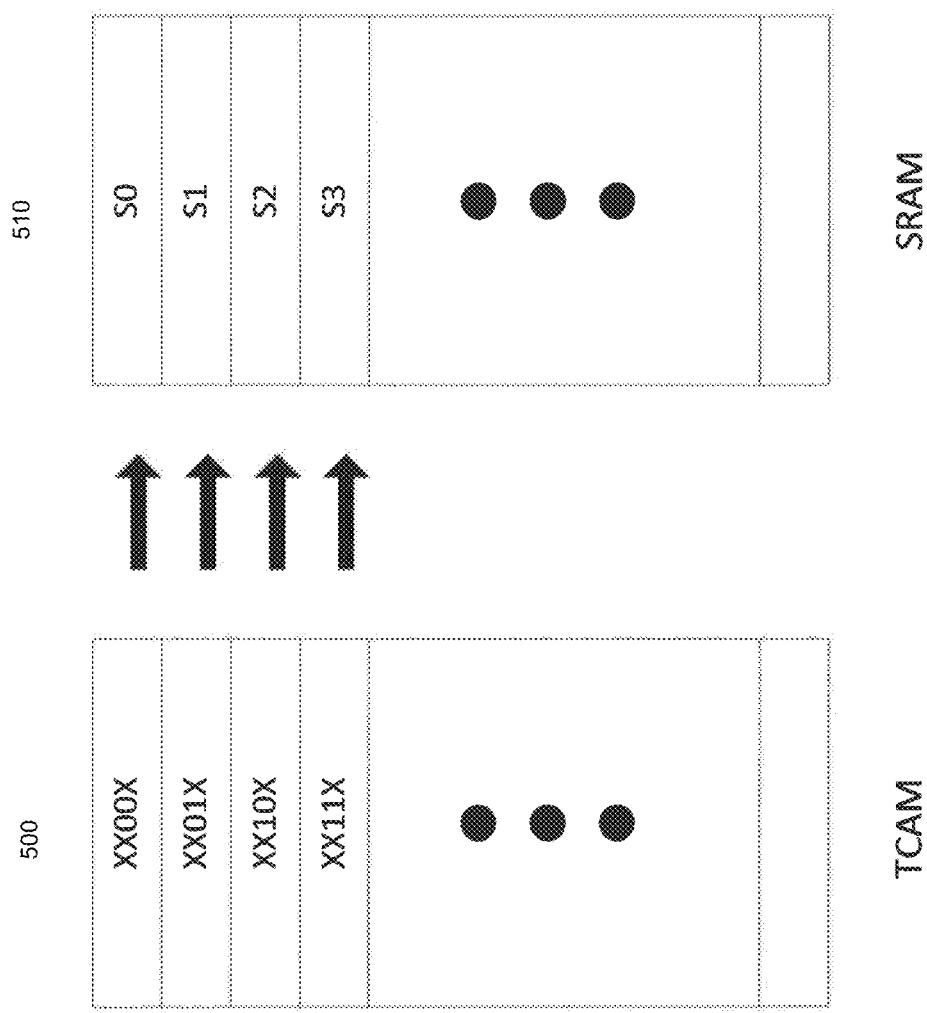
FIG. 5 illustrates a TCAM table and its SRAM table in each leaf switch, according to various aspects of the subject technology.

FIG. 5 illustrates a Ternary Content Addressable Memory (TCAM) table 500 and its Static Random Access Memory (SRAM) table 510 in each leaf switch 110, according to various aspects of the subject technology. The controller 200 may be communicatively coupled to a plurality of leaf switches 110 which are communicatively coupled to a TCAM 500 and SRAM 510. TCAM 500 and SRAM 510 may be configured to provide high-speed searching as disclosed herein. The TCAM 500 and SRAM 510 are configured to perform the load balancing techniques at the direction of the controller 200.

Most Top-of-Rack (ToR) switches which perform forwarding and policing functions in the data center network utilize a specialized content addressable memory for storing rules. This memory is housed inside the switch ASIC (Application Specific Integrated Circuit), which allows for hardware based forwarding of data packets. A CPU or processor that receives configuration requests from the controller 200 to program the TCAM 500 and SRAM 510. The ASIC directs an incoming packet at an interface to another interface based on the content of the TCAM 500 and SRAM 510.

A TCAM 500 consists of many entries and when it is given an input string it compares the string against all entries and reports the first entry that matches the input. A TCAM is a fully associative memory in which the input can be searched not only for a binary "1" or "0," but also for a ternary "X" (don't care). For example, the search tag "110X" matches both "1101" and "1100". Given a request, a TCAM 500 lookup is performed and then all matching results are retrieved with a secondary SRAM 510 lookup.

By loading the forwarding table prefixes into the TCAM 500 in decreasing order of prefix length, the TCAM 500 index of the longest matching prefix for any destination address may be determined in one TCAM 500 cycle. Using this index, the word of SRAM 510 can be accessed where the next hop associated with the matching prefix is stored and complete the forwarding task. The TCAM 500 solution to packet forwarding requires one TCAM 500 search and one SRAM 510 access to forward a packet.

A TCAM 500 is provided, and may be capable of operating at speeds approaching the speed of the programmable hardware itself. TCAM 500 compares the search input to a table of stored data. TCAM 500 looks up the IP address as it appears in a flow. The controller 200 assigns each flow to a node for servicing, such as a host server. TCAM 500 may include a table mapping traffic buckets to servers. The controller 200 rewrites the L2 header for the incoming packets to direct them to the leaf switches 110. The controller 200 acts as a switch, by switching or routing the packets to the leaf switches provided by their new L2 headers.

In this example, the TCAM 500 stores data that describes attributes of a packet to which a match is to be made, and the SRAM 510 stores the data that describes the action to be taken when a corresponding match occurs in the SRAM 510. If the IP address of a packet falls within a range indicated by a TCAM 500 entry, then the action to be taken, is to direct that packet to server listed in the SRAM 510 entry corresponding to the TCAM 500 entry. For example, if the IP address of a packet falls within the range indicated by XX00X, then the directing of traffic is directed to S0. The load balancing function is achieved by configuring the entries stored in the TCAM 500 and SRAM 510 to achieve the desired directing of packets to a particular active and available server.

Figure 6:
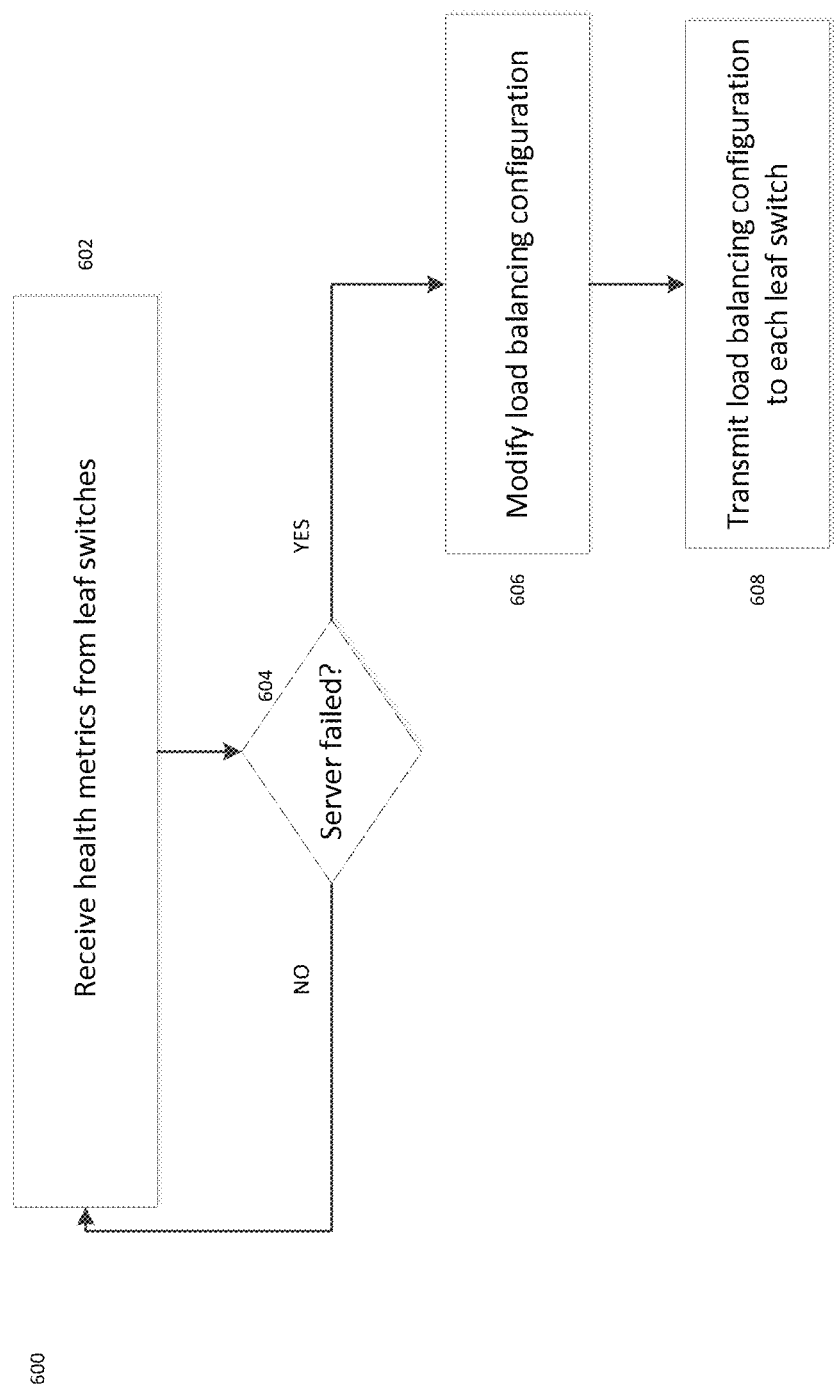
FIG. 6 is a flowchart of a method performed by a controller, according to various aspects of the subject technology.

FIG. 6 is a flowchart of a method 600 performed by a controller 200, according to various aspects of the subject technology. It should be understood that, for any method discussed herein, there can be additional, fewer, or alternative steps performed in similar or alternative orders, or in parallel, within the scope of the various embodiments unless otherwise stated. The method 600 can be performed by a controller 200, such as a Data Center Network Manager (DCNM) or similar system.

At step 602, the controller 200 may receive health metrics from a plurality of leaf switches 110 in a network fabric. The health monitoring metrics received from each leaf switch 110 are associated with the local servers 120 managed by the particular leaf switch 110. Any particular leaf switch 110 in the network fabric may probe the services nodes (servers 120, VMs, containers, applications, services, processes, or any other unit of processing/compute) that the particular leaf switch 110 is connected to. In some embodiments, a leaf switch 110 may not need to prove the servers 120 that are not mounted to the leaf switch. The probing mechanism can be in the form of an Internet Control Message Protocol (ICMP) request (e.g., ping and traceroute) and ICMP response.

At step 604, the controller 200 will determine that one or more servers 120 in the network fabric have failed. This may be communicated to the controller 200 by the particular leaf switch 110 that is managing the failed server. The controller 200 subscribes to the messages published by the plurality of leaf switches 110 in the network fabric. Each leaf switch 110 constantly publishes health monitoring metrics of the one or more servers 120 they are managing.

The controller 200 may modify the load balancing configuration for the network fabric at step 606 after it determines that a server has failed. For example, the controller 200 may propagate information, received by a particular leaf switch 110 about the failed server 120 to all of the other leaf switches 110 in the network fabric. When a server 120 fails, the hardware programming on all of the leaf switches 110 is modified to reflect an available and active server to replace the failed server.

At operation 608, the controller 200 transmits the modified load balancing configuration to each of the plurality of leaf switches 110 in the network fabric. The leaf switches 110 then update the SRAM 510 entry that corresponds to TCAM 500 entry of the failed server. The TCAM 500 and SRAM 510 tables are in every leaf switch 110 in the network fabric. All of the tables belonging to the leaf switches 110 in the network fabric will be modified. The TCAM 500 table will determine if there is a match in the address and will send the packet to a particular active and available server rather than the failed server by modifying the SRAM 510 entry corresponding to the address.

Figure 7A:
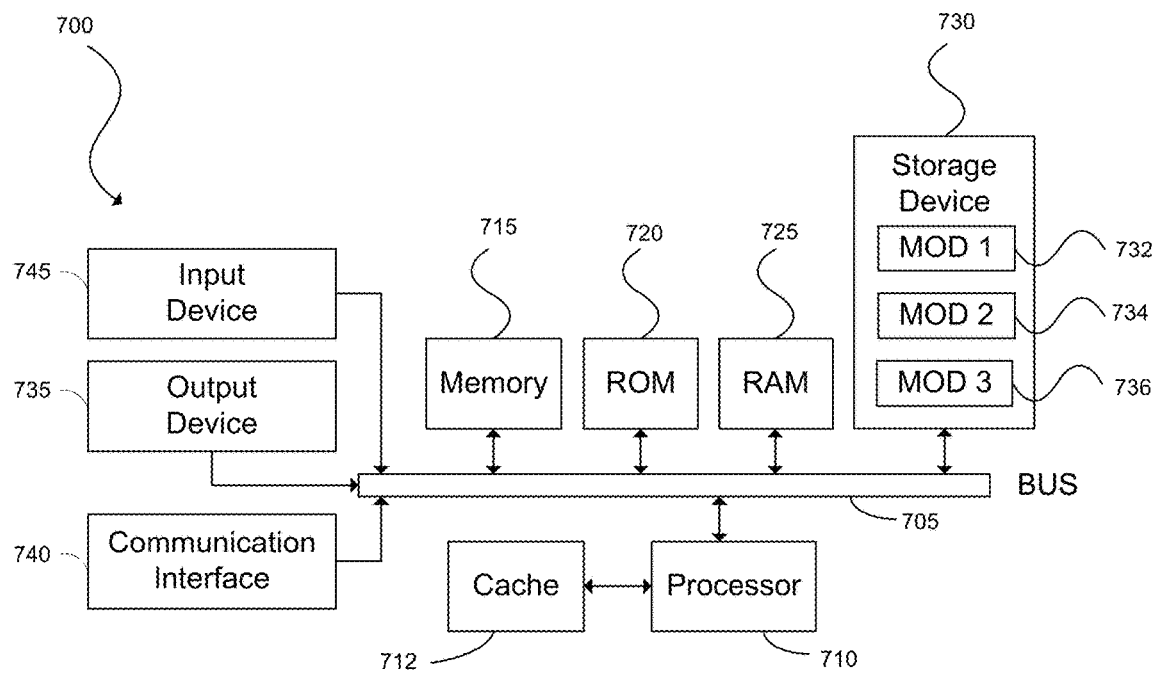
FIGS. 7A and 7B illustrate examples of systems, according to various aspects of the subject technology.
Figure 7B:
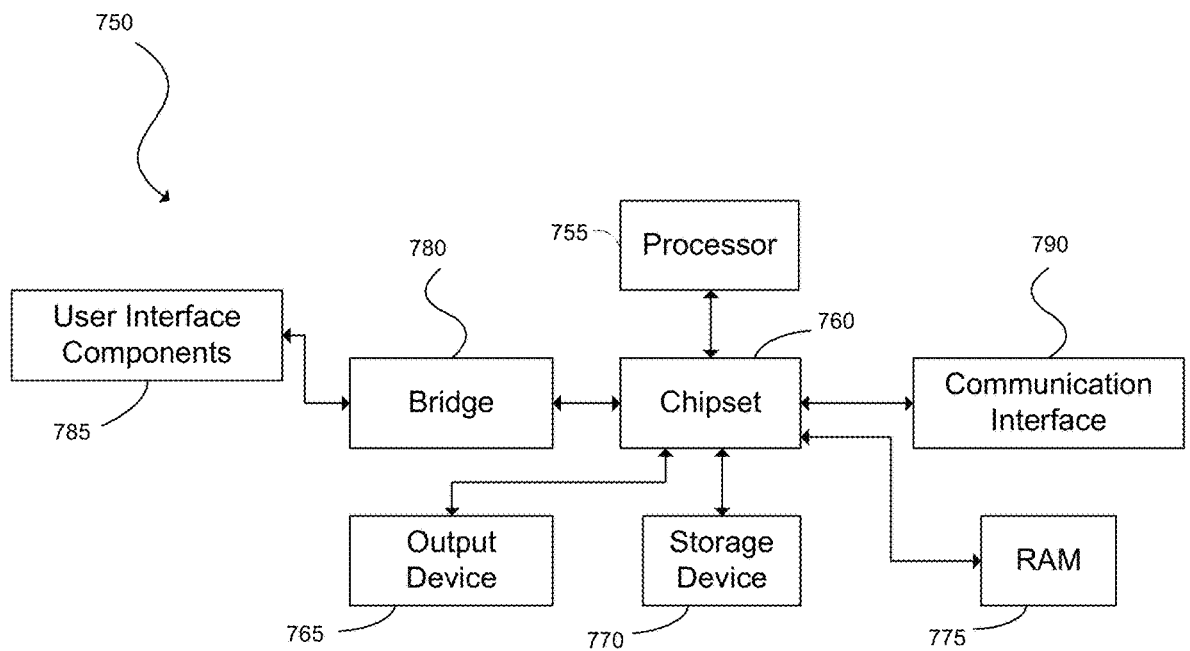

FIG. 7A and FIG. 7B illustrate systems in accordance with various embodiments. The more appropriate system will be apparent to those of ordinary skill in the art when practicing the various embodiments. Persons of ordinary skill in the art will also readily appreciate that other systems are possible.

FIG. 7A illustrates an example architecture for a conventional bus computing system 700 wherein the components of the system are in electrical communication with each other using a bus 705. The computing system 700 can include a processing unit (CPU or processor) 710 and a system bus 705 that may couple various system components including the system memory 715, such as read only memory (ROM) in a storage device 720 and random access memory (RAM) 725, to the processor 710. The computing system 700 can include a cache 712 of high-speed memory connected directly with, in close proximity to, or integrated as part of the processor 710. The computing system 700 can copy data from the memory 715 and/or the storage device 730 to the cache 712 for quick access by the processor 710. In this way, the cache 712 can provide a performance boost that avoids processor delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing system 700, an input device 745 can represent any number of input mechanisms, such as a microphone for speech, a touch-protected screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing system 700. The communications interface 740 can govern and manage the user input and system output. There may be no restriction on operating on any particular hardware arrangement and therefore the basic features here may easily be substituted for improved hardware or firmware arrangements as they are developed.

Storage device 730 can be a non-volatile memory and can be a hard disk or other types of computer readable media which can store data that are accessible by a computer, such as magnetic cassettes, flash memory cards, solid state memory devices, digital versatile disks, cartridges, RAMs 725, read only memory (ROM) 720, and hybrids thereof.

The storage device 730 can include software modules 732, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, output device 735, and so forth, to carry out the function.

FIG. 7B illustrates an example architecture for a conventional chipset computing system 750 that can be used in accordance with an embodiment. The computing system 750 can include a processor 755, representative of any number of physically and/or logically distinct resources capable of executing software, firmware, and hardware configured to perform identified computations. The processor 755 can communicate with a chipset 760 that can control input to and output from the processor 755. In this example, the chipset 760 can output information to an output device 765, such as a display, and can read and write information to storage device 770, which can include magnetic media, and solid state media, for example. The chipset 760 can also read data from and write data to RAM 775. A bridge 780 for interfacing with a variety of user interface components 785 can be provided for interfacing with the chipset 760. The user interface components 785 can include a keyboard, a microphone, touch detection and processing circuitry, a pointing device, such as a mouse, and so on. Inputs to the computing system 750 can come from any of a variety of sources, machine generated and/or human generated.

The chipset 760 can also interface with one or more communication interfaces 790 that can have different physical interfaces. The communication interfaces 790 can include interfaces for wired and wireless Local Area Networks (LANs), for broadband wireless networks, as well as personal area networks. Some applications of the methods for generating, displaying, and using the Graphical User Interface (GUI) disclosed herein can include receiving ordered datasets over the physical interface or be generated by the machine itself by processor 755 analyzing data stored in the storage device 770 or the RAM 775. Further, the computing system 700 can receive inputs from a user via the user interface components 785 and execute appropriate functions, such as browsing functions by interpreting these inputs using the processor 755.

It will be appreciated that computing systems 700 and 750 can have more than one processor 710 and 755, respectively, or be part of a group or cluster of computing devices networked together to provide greater processing capability.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
    requesting, by a controller running a subscription application configured to receive messages from a publication application on a topic, to subscribe to the topic;
    receiving, at the controller, messages on the topic including at least health monitoring metrics from a plurality of load balancer leaf switches in a network fabric, each leaf switch of the plurality of load balancer leaf switches running the publication application configured to continuously publish messages on the topic, each leaf switch of the plurality of load balancer leaf switches manage one or more local servers of a plurality of local servers, each leaf switch only probes the one or more local servers it manages, and in response to a probe, each local server of the plurality of local servers only provides the health monitoring metrics to its respective managing leaf switch;
    determining, at the controller based on the health monitoring metrics, that a local server of the plurality of local servers in the network fabric has failed; and
    modifying, by the controller, a load balancing configuration for the network fabric; and
    transmitting, by the controller, the load balancing configuration to the plurality of load balancer leaf switches, wherein
    the load balancing configuration includes instructions for each leaf switch of the plurality of load balancer leaf switches to replace reference to the local server of the plurality of local servers in the network fabric that has failed in a Static Random Access Memory (SRAM) that is associated with a Ternary Content Addressable Memory (TCAM),
    the TCAM including forwarding table prefixes and the SRAM including corresponding actions to be taken for each of the prefixes.

2. The method of claim 1, wherein a particular load balancer leaf switch probes only the one or more local servers that the particular load balancer leaf switch is connected to.

3. The method of claim 1, further comprising: updating, in each load balancer leaf switch, an entry in a Static Random Access Memory (SRAM) table corresponding to a Ternary Content Addressable Memory (TCAM) table of the local server in the network fabric that has failed.

4. The method of claim 3, wherein updating the Static Random Access Memory (SRAM) table in each load balancer leaf switch results in load balancing of client traffic to an available and active local server of the plurality of local servers.

5. The method of claim 4, wherein the available and active server can be on standby by user configuration.

6. The method of claim 1, wherein the health monitoring metrics include health monitoring metrics for services hosted on the local servers.

7. A controller, running a subscription application configured to receive messages from a publication application on a topic, the controller comprising:
    one or more processors; and
    a computer-readable storage medium having stored therein instructions which, when executed by the one or more processors, cause the one or more processors to perform operations comprising:
        requesting to subscribe to the topic;
        receiving messages on the topic including at least health monitoring metrics from a plurality of load balancer leaf switches in a network fabric, each leaf switch of the plurality of load balancer leaf switches running the publication application configured to continuously publish messages on the topic, each leaf switch of the plurality of load balancer leaf switches manage one or more local servers of a plurality of local servers, each leaf switch only probes the one or more local servers it manages, and in response to a probe, each local server of the plurality of local servers only provides the health monitoring metrics to its respective managing leaf switch;
        determining, based on the health monitoring metrics, that a local server of the plurality of local servers in a fabric have failed;
        modifying a load balancing configuration for the network fabric; and
    transmitting the load balancing configuration to each leaf switch in the plurality of leaf switches in the network fabric; and
        transmitting the load balancing configuration to the plurality of load balancer leaf switches, wherein
    the load balancing configuration includes instructions for each leaf switch of the plurality of load balancer leaf switches to replace reference to the local server of the plurality of local servers in the network fabric that has failed in a Static Random Access Memory (SRAM) that is associated with a Ternary Content Addressable Memory (TCAM),
        the TCAM including forwarding table prefixes and the SRAM including corresponding actions to be taken for each of the prefixes.

8. The controller of claim 7, wherein the controller is an application installed on a server that communicates with the leaf switches through a management network.

9. The controller of claim 8, wherein the management network tracks performance throughout an external network.

10. The controller of claim 7, wherein the controller is notified by a load balancer leaf switch connected to the local server in the network fabric that has failed.

11. The controller of claim 10, wherein the controller sends a message to each load balancer leaf switch of the plurality of load balancer leaf switches to modify the SRAM entry of the local server in the network fabric that has failed in the Static Random Access Memory (SRAM) table corresponding to a Ternary Content Addressable Memory (TCAM) table.

12. A non-transitory computer-readable medium carrying one or more sequences of instructions which, when executed by one or more processors of a controller running a subscription application configured to receive messages from a publication application on a topic, cause the one or more processors to carry out the steps of:

requesting to subscribe to the topic;

receiving messages on the topic including at least health monitoring metrics from a plurality of load balancer leaf switches in a network fabric, each leaf switch of the plurality of load balancer leaf switches running the publication application configured to continuously publish messages on the topic, each leaf switch of the plurality of load balancer leaf switches manage one or more service nodes of a plurality service nodes, each leaf switch only probes the one or more service nodes it manages, and in response to a probe, each service node of the plurality of service nodes only provides the health monitoring metrics to its respective managing leaf switch;

determining, from the health monitoring metrics, that one or more service nodes in the network fabric have failed;

modifying a load balancing configuration of the one or more service nodes in the network fabric based on the health monitoring metrics;

transmitting the load balancing configuration to each leaf switch in the plurality of load balancer leaf switches in the network fabric; and updating a Static Random Access Memory (SRAM) table of each leaf switch corresponding to a Ternary Content Addressable Memory (TCAM) table of the one or more service nodes in the network fabric that has failed to replace reference to the one or more service nodes in the network fabric that has failed, the TCAM including forwarding table prefixes and the SRAM including corresponding actions to be taken for each of the prefixes.

13. The non-transitory computer-readable medium of claim 12, wherein a particular load balancer leaf switch probes only one or more local service nodes of the plurality of local service nodes that the particular load balancer leaf switch is connected to.

14. The non-transitory computer-readable medium of claim 12, wherein updating the Ternary Content Addressable Memory (TCAM) and Static Random Access Memory (SRAM) table in each load balancer leaf switch results in load balancing of client traffic to an available and active service nodes of the plurality of service nodes.

15. The method of claim 1, wherein the controller is an application installed on a server that communicates with the leaf switches through a management network.

16. The method of claim 15, wherein the management network tracks performance throughout an external network.

17. The non-transitory computer-readable medium of claim 12, wherein the controller is an application installed on a server that communicates with the leaf switches through a management network.

18. The non-transitory computer-readable medium of claim 17, wherein the management network tracks performance throughout an external network.

19. The controller of claim 7, further comprising instructions which when executed by the one or more processors, cause the one or more processors to perform operations comprising: sending instructions to each load balancer leaf switch to update an entry in a Static Random Access Memory (SRAM) table corresponding to a Ternary Content Addressable Memory (TCAM) table of the local server in the network fabric that has failed.

20. The controller of claim 7, wherein updating the Static Random Access Memory (SRAM) table in each load balancer leaf switch results in load balancing of client traffic to an available and active local server of the plurality of local servers.

* * * * *